US011214145B2

(12) United States Patent
Miller, Jr. et al.

(10) Patent No.: US 11,214,145 B2
(45) Date of Patent: Jan. 4, 2022

(54) IN-VEHICLE GPS GEO-FENCING ROUTE PLANNING, GPS PROXIMITY BASED ADVERTISING, INFOTAINMENT SYSTEM ADVERTISING AND INFOTAINMENT SYSTEM PICTURE OR VIDEO EMERGENCY ALERT DISPLAY

(71) Applicants: Douglas Charles Miller, Jr., Franklin, MI (US); Jeffrey Floyd Miller, Lebanon, OH (US)

(72) Inventors: Douglas Charles Miller, Jr., Franklin, MI (US); Jeffrey Floyd Miller, Lebanon, OH (US)

( * ) Notice: Subject to any disclaimer, the term of this patent is extended or adjusted under 35 U.S.C. 154(b) by 119 days.

(21) Appl. No.: 16/681,747

(22) Filed: Nov. 12, 2019

(65) Prior Publication Data

US 2020/0101844 A1 Apr. 2, 2020

Related U.S. Application Data

(63) Continuation-in-part of application No. 15/849,983, filed on Dec. 21, 2017, now abandoned.

(51) Int. Cl.
*B60K 35/00* (2006.01)
*G06Q 30/02* (2012.01)
(Continued)

(52) U.S. Cl.
CPC ......... *B60K 35/00* (2013.01); *G06Q 30/0265* (2013.01); *H04W 4/021* (2013.01);
(Continued)

(58) Field of Classification Search
None
See application file for complete search history.

(56) References Cited

U.S. PATENT DOCUMENTS 6,665,613 B2 * 12/2003 Duvall ............... B60R 25/1012
701/485
6,898,517 B1 * 5/2005 Froeberg ............... G01C 21/26
340/691.6

(Continued)

*Primary Examiner* — Michael J Zanelli
(74) *Attorney, Agent, or Firm* — Hulsey P.C.

(57) ABSTRACT

Static OEM hard-wired in-vehicle infotainment system method to capture and transmit vehicle route data for a defined geo-fenced area. Collects and transmits vehicle data to cloud server and maps geo-fenced area using GPS coordinates to produce report and vehicle route onto infotainment screen. Collective summery report and graphical display for all vehicles within a defined GPS Geo-Fenced area can also be displayed. Additional methodology includes GPS Proximity Based Advertising and Infotainment System Advertising. GPS Proximity Based Advertising defines radius around a GPS location, displaying advertisement when vehicle enters the radius. Infotainment System Advertising receives advertisement via software or firmware, onto the OEM hard-wired in-vehicle infotainment system memory. Additional methodology includes receiving and displaying emergency alert emanating from integrated public alert and warning system compliant common alert protocol alert origination tool onto static OEM hard-wired in-vehicle infotainment system, GUI to display an image, picture, video or hologram.

20 Claims, 14 Drawing Sheets

(51) Int. Cl.
*H04W 4/40* (2018.01)
*H04W 4/021* (2018.01)

(52) U.S. Cl.
CPC ......... *H04W 4/40* (2018.02); *B60K 2370/164* (2019.05); *B60K 2370/166* (2019.05); *B60K 2370/167* (2019.05); *B60K 2370/178* (2019.05); *B60K 2370/58* (2019.05)

(56) References Cited

U.S. PATENT DOCUMENTS

| | | | | |
|---|---|---|---|---|
| 7,973,707 | B2* | 7/2011 | Verechtchiagine | G01S 19/42 342/357.33 |
| 8,817,706 | B2* | 8/2014 | Ichihara | H04L 12/6418 370/328 |
| 2013/0145482 | A1* | 6/2013 | Ricci | B60W 40/08 726/28 |
| 2015/0185030 | A1* | 7/2015 | Monroe | G01C 21/3438 701/532 |
| 2015/0256276 | A1* | 9/2015 | Jones | H04H 60/65 455/3.01 |
| 2016/0350984 | A1* | 12/2016 | Tieman | G07C 5/008 |

* cited by examiner

200

| Time of Day | Gear | Vehicle Speed (MPH/KMH) | Vehicle Engine | Cardinal Directions | | Altitude (Feet/Meters) | Time Duration in Gear (minutes) |
|---|---|---|---|---|---|---|---|
| | | | | Latitude | Longitude | | |
| 5:01:00 | Drive | 8 MPH | On | 39.294325 | -84.302647 | 253 meters | 0 |
| 5:01:05 | Drive | 6 MPH | On | 39.29455 | -84.302776 | 254 meters | 0:05 |
| 5:01:10 | Drive | 5 MPH | On | 39.294666 | -84.302878 | 254 meters | 0:10 |
| 5:01:15 | Drive | 5 MPH | On | 39.294768 | -84.302908 | 254 meters | 0:15 |
| 5:01:20 | Drive | 5 MPH | On | 39.294877 | -84.302919 | 255 meters | 0:20 |
| 5:01:25 | Drive | 5 MPH | On | 39.29511 | -84.30294 | 255 meters | 0:25 |
| 5:01:30 | Drive | 5 MPH | On | 39.295182 | -84.30291 | 255 meters | 0:30 |
| 5:01:35 | Drive | 3 MPH | On | 39.295355 | -84.302948 | 255 meters | 0:35 |
| 5:01:40 | Drive | 1 MPH | On | 39.29554 | -84.302957 | 255 meters | 0:40 |
| 5:01:45 | Park | 0 MPH | Off | 39.295548 | -84.302932 | 256 meters | 0:00 |
| 5:01:50 | Park | 0 MPH | Off | 39.295548 | -84.302932 | 256 meters | 0:05 |
| 5:01:55 | Park | 0 MPH | Off | 39.295548 | -84.302932 | 256 meters | 0:10 |
| 5:02:00 | Park | 0 MPH | Off | 39.295548 | -84.302932 | 256 meters | 0:15 |

IN-VEHICLE GPS GEO-FENCING ROUTE PLANNING, GPS PROXIMITY BASED ADVERTISING, INFOTAINMENT SYSTEM ADVERTISING AND INFOTAINMENT SYSTEM PICTURE OR VIDEO EMERGENCY ALERT DISPLAY

Disclosed Continuation-In-Part Application claims the benefit of U.S. Nonprovisional application Ser. No. 15/849,983, US20190135109A1, filed Dec. 21, 2017.

BACKGROUND

As vehicle Original Equipment Manufacturers (OEM) adopt hard-wired in-vehicle infotainment systems, the ability to more accurately collect, receive and transmit data becomes possible. One significant advantage of the collection, receipt and transmittal of data from the OEM equipment, including the OEM hard-wired in-vehicle infotainment system, is the ability to monitor vehicle speed, vehicle gear selection, including Park, Drive and Reverse, vehicle engine ON or OFF, vehicle GPS location and map of a defined grid using GPS latitude and longitude coordinates in decimal degrees or degrees minute seconds. Along with the increased possibilities for the collection and transmittal of more accurate data, comes the ability to transmit advertisements, both with and without using GPS location, onto the OEM hard-wired in-vehicle infotainment system. In addition to the advertising, the increased possibility to display an image, picture, video or hologram from an Integrated Public Alert and Warning System (IPAWS) directly onto the hard-wired in-vehicle infotainment system becomes possible.

Firmware or software specifically developed for an OEM hard-wired in-vehicle infotainment systems has not been developed and integrated into a vehicle, for the purposes of collecting vehicle traffic patterns for a defined GPS area, using OEM supplied in-vehicle modules like the body control module (BCM), powertrain control module (PCM) or transmission control module (TCM). Data to be transmitted from the vehicle over any combination of communication networks, including, but not limited to Local Interconnect Network (LIN), Local Area Network (LAN), High Speed CAN (HSCAN), Low Speed CAN (LSCAN), InfotainmentCAN (InfoCAN) or any other CAN bus network will include the time taken for a vehicle to enter or exit the defined GPS area, actual vehicle speed as the vehicle enters and remains in the defined GPS area, direction analytics for vehicle route measured by GPS latitude and longitude coordinates in decimal degrees or degrees minute seconds, duration vehicle remains in the defined GPS area, vehicle gear selection including Park, Drive and Reverse, vehicle engine ON or OFF.

Existing in-vehicle traffic monitoring systems use a vehicle's infotainment system wirelessly paired, via blue-tooth, to a peripheral device like a cellular phone. Crowdsourcing applications on the blue-tooth phone use cell tower triangulation to determine vehicle speed. Other traffic monitoring systems require both a control module to record vehicle speed and vector positioning, as well as a transmitter to send the data that is coupled to the vehicles GPS. In addition to the control module and transmitter, an external traffic monitoring system is required to be placed near the roadway.

This disclosure also relates to a method utilized for In-vehicle GPS Geo-Fencing Route Planning, used to monitor traffic flow within a defined GPS geo-fenced area, using a vehicles actual speed, as reported on the vehicle instrument control panel. OEM equipped communication networks and OEM hard-wired modules in conjunction with the GPS Coordinate Geo-Fencing Planning software provide a more accurate representation of speed, while not relying exclusively on continual cellular data transmissions or external transmissions.

Vehicles equipped with an OEM hard-wired in-vehicle infotainment system with GPS Geo-Fencing Route Planning can display actual and projected vehicle routes, within a defined geo-fenced area. Crowdsourcing vehicle data from vehicles equipped with In-vehicle GPS Geo-Fencing Route Planning firmware or software enables route projections. Route projections within a defined GPS geo-fenced area can be used to project routes based on historical or real-time data such as least congested parking areas or shortest walk into a destination.

This disclosure also relates to the data collection and transmittal method from the In-vehicle GPS Geo-Fencing Route Planning System. Data will be stored or sent via OEM equipped hardware and existing OEM equipped communication networks including over any combination of communication networks, including, but not limited to LIN, LAN, HSCAN, LSCAN, InfoCAN or any other CAN bus network. The OEM hard-wired in-vehicle infotainment system will be used to in-conjunction with other vehicle modules to collect and transmit vehicle data such as vehicle speed, vehicle camera(s), vehicle object detection sensors, vehicle cardinal directions (North, South, East and West) or time duration of vehicle idling. More accurate depiction of vehicle traffic patterns for a defined GPS area are possible using the In-vehicle Traffic and In-vehicle GPS Geo-Fencing Route Planning Software. Additions such as time taken for a vehicle to enter or exit the defined GPS area, visual inspection of road surface conditions including pot-holes, visual of obstacle obstructions, speed of the vehicle within the defined GPS area, route of the vehicle in the defined GPS area and duration a vehicle once it enters the defined GPS area is now possible.

This disclosure also relates to GPS Proximity Based Advertising. GPS Proximity Based Advertising recognizes a vehicles GPS coordinates relative to a defined GPS coordinate grid and as a result will produce virtual advertising onto an OEM hard-wired in-vehicle infotainment system. When a vehicle nears or enters the defined GPS coordinate grid, a localized advertisement will appear on the Graphic User Interface (GUI) of the OEM hard-wired in-vehicle infotainment system. Advertisements can include any and all displays, including, but not limited to pin-points on navigation maps that display local attractions including parks, restaurants, grocery stores, hospitals, schools, etc. Navigation based advertisements will include interactive one-touch directions, restaurant menus, audio, video or text displays.

This disclosure also relates to non-GPS Proximity Based Advertising or an Infotainment System Advertising method able to transmit and receive audio or video advertisements directly onto the OEM equipped hardware, while using OEM communication networks, to an OEM in-vehicle infotainment system or GPS screen. Using the OEM communication networks, including, but not limited to LIN, LAN, HSCAN, LSCAN, InfoCAN or any other CAN bus network, advertisements will be sent from a cloud-based server to the vehicles Satellite, GPS, Cellular, PCS or Wi-Fi antenna, where the advertisement will be processed either by a gateway module (GWM) or directly onto the OEM hard-wired in-vehicle infotainment system for display. The Infotainment System Advertising method introduces the ability to display advertised content received from the OEM equipped Satellite, GPS, Cellular, PCS or Wi-Fi antenna, translated through the GWM, if equipped, and displayed onto the OEM hard-wired in-vehicle infotainment system.

This disclosure also relates to firmware or software included on the OEM hard-wired in-vehicle infotainment system capable of displaying an IPAWS visual alert, image, picture, video or hologram, originating from an IPAWS compliant CAP Alert Origination Tool, transmitted via an Alert Disseminator. According to the National Center for Missing and Exploited Children's 2015 Annual AMBER Alert Report, the most common reason for an AMBER Alert success story is an individual or law enforcement recognizing the vehicle from the alert at 42 percent (n=21) followed by the abductor hearing the alert and releasing the child at 20 percent (n=10). By providing a visual alert, image, picture, video or 2D and 3D hologram of the suspect, victim, vehicle, license plate, etc., directly onto an OEM hard-wired in-vehicle infotainment system will increase the percentage of victims found alive and reduce the time in finding them. Both law enforcement and private citizens will cognitively recognize the vehicle, suspect or missing person from the OEM hard-wired in-vehicle infotainment system GUI, which will prevent abductors from traveling greater distances and aid in a safe recovery.

Existing OEM hard-wired in-vehicle infotainment systems are currently limited to displaying only emergency broadcast text messages originating from radio transmissions. The Infotainment System Picture or Video Emergency Alert Display introduces a system to display a visual alert in the form of an image, picture, video or hologram onto an OEM hard-wired in-vehicle infotainment system. The Infotainment System Picture or Video Emergency Alert Display is activated when an Alerting Authority transmits an IPAWS visual alert or image, picture, video or hologram onto an OEM hard-wired in-vehicle infotainment system from a CAP Origination Tool and transmitted via an Alert Disseminator. An Alert Disseminator then transmits the visual alert multimedia file extension to the vehicle antenna(s), where the visual alert multimedia file is transmitted, via a hard-wired connection to the OEM hard-wired GWM. The GWM then transmits the visual alert multimedia file via a LIN, LAN, HSCAN, LSCAN, InfoCAN or any other CAN bus network to the OEM in-vehicle infotainment system. Firmware and or software included with the Infotainment System Picture or Video Emergency Alert Display will process the visual alert multimedia file for display onto the OEM hard-wired in-vehicle infotainment system.

SUMMARY

The following is a brief summary of subject matter that is described in greater detail herein. This summary is not intended to be limiting as to the scope of the claims.

The In-vehicle Geo-Fencing Route Planning application will collect actual in-vehicle GPS coordinates using the GPS coordinates as measured from the vehicle's GWM, once the vehicle enters into a pre-defined GPS coordinate area. The movement of the vehicle, defined by the GPS coordinates within the pre-defined area, will be collected and sent at a set time interval via an OEM hard-wired Satellite, GPS, Cellular, PCS or Wi-Fi antenna. Individual GPS coordinate information within the pre-defined area will be transmitted to a cloud-base server. The cloud-based server will collect the GPS data from a multitude of individual vehicles and compress the collective data for mapping and predictive route patterns within the defined GPS area. Information from the compressed file will include a GUI of individual vehicle routes displayed onto a navigation map, as well as hard data including time spent in the defined GPS area, time vehicle spent parked in the defined GPS area, time in Reverse in the defined GPS area and time spent in Drive or other forward moving gear and speed of the vehicle.

This disclosure also relates to GPS Proximity Based Advertising, a method to directly display an interactive web-advertisement, including but not limited to a map of advertised locations, display phone numbers for single touch dialing, display advertised symbols, play audio recordings, play video and audio recordings, display emojis or generate a hyperlink to internet enabled content onto a stationary OEM hard-wired in-vehicle infotainment system. GPS Proximity Based Advertisements display advertised content onto the OEM hard-wired in-vehicle infotainment system by defining a perimeter or geo-fence using firmware or software loaded onto the GWM, OEM hard-wired in-vehicle infotainment system. As the vehicle enters into the defined GPS perimeter, the advertised content will be displayed onto either the navigation map or any other GUI included with the OEM hard-wired in-vehicle infotainment system. The pre-defined GPS perimeter is stored onto the OEM hard-wired GWM, OEM hard-wired in-vehicle infotainment system or stored on a cloud-based server. Advertised content will only initiate once the vehicle GPS coordinates, as received from the OEM equipped Satellite, GPS, Cellular, PCS or Wi-Fi antenna enters into the defined GPS area.

This disclosure also relates to any other method used to directly display an interactive web-advertisement, including, but not limited to a map of advertised locations, phone number display for single touch dialing, advertised symbol display, play audio recordings, play video and audio recordings, display emojis or generate a hyperlink to internet enabled content onto a stationary OEM hard-wired in-vehicle infotainment system. Advertisements for display onto the OEM hard-wired in-vehicle infotainment system will be transmitted out from a cloud server or mobile switching center, to a satellite, GPS, cellular tower, PCS or Wi-Fi transmitter, then out to the vehicle's antenna and processed through the OEM equipped communication network system to the GWM, but also capable of transmitting directly onto the OEM hard-wired in-vehicle infotainment system.

This disclosure also relates to any method used to display an image, picture or video file onto a static OEM hard-wired in-vehicle infotainment system sent from an IPAWS visual alert emanating from a Common Alert Protocol (CAP) Alert Origination Tool via an Alert Disseminator(s). The Infotainment System Picture or Video Emergency Alert Display System runs firmware or software, which is downloaded directly onto the memory of an OEM hard-wired in-vehicle infotainment system, capable of recognizing the IPAWS visual alert multimedia file transmitted from a satellite, Wi-Fi or cellular tower. The Infotainment System Picture or Video Emergency Alert Display application then executes a unique protocol to validate the IPAWS video alert multimedia file. If validated as an IPAWS visual alert, then a second protocol will be run to recognize the video alert multimedia file. If the OEM hard-wired in-vehicle infotainment system recognizes the visual alert multimedia file, a subroutine runs, opening up a compatible multimedia player to start the display of the IPAWS visual alert.

BRIEF DESCRIPTION OF THE DRAWINGS

FIG. 2 is a collection of data for an individual vehicle obtained from the GPS Geo-Fencing Route Planning System.

DETAILED DESCRIPTION

Figure 1:
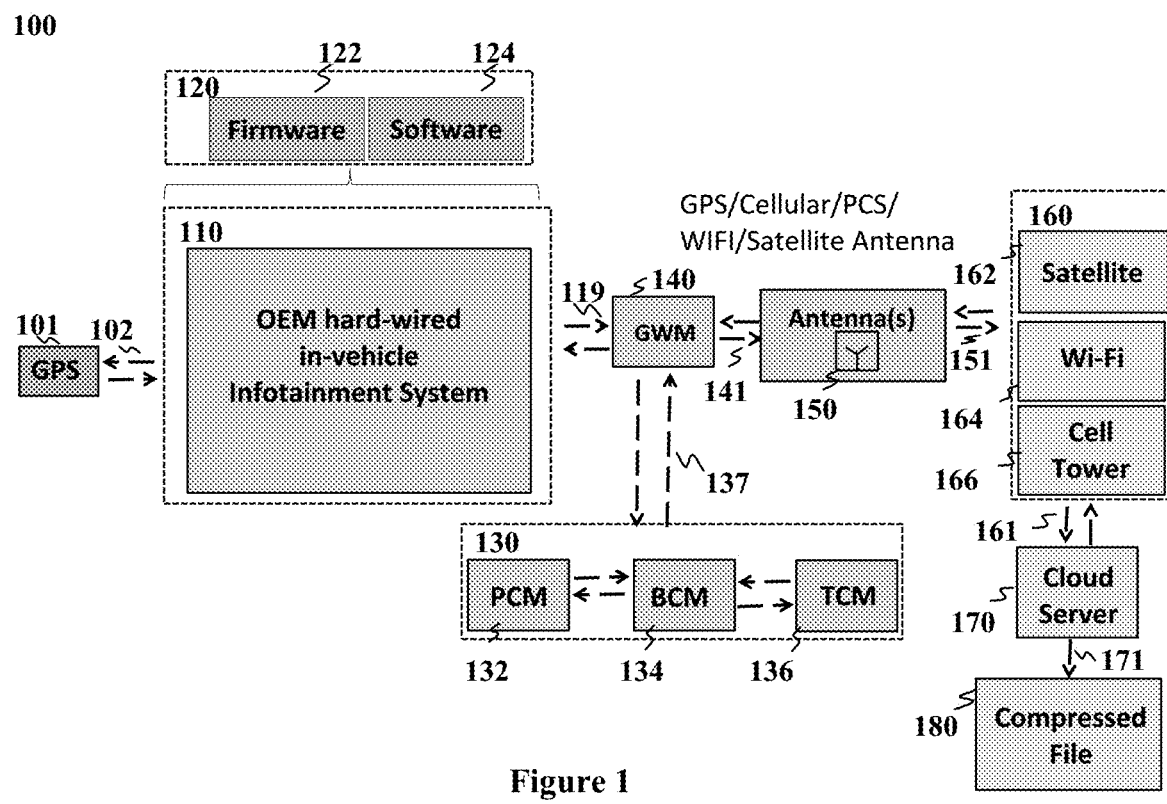
FIG. 1 is a flow diagram of an exemplary system that facilitates OEM hard-wired in-vehicle communication network for GPS data transmission.

Pertaining to systems for Geo-Fencing Route Planning, Infotainment System Advertising and Infotainment System Picture or Video Emergency Alert Display onto an OEM hard-wired in-vehicle infotainment system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

As used herein, the term "infotainment system" and "in-vehicle infotainment system" is intended to encompass an OEM hard-wired in-vehicle touchscreen module, vehicle radio coupled to an in-vehicle touchscreen, a vehicle radio coupled to an in-vehicle LCD or LED screen, an audio and video control module coupled to an in-vehicle LCD or LED screen or an in-vehicle holographic display or touch interface. Additionally, as used herein, the term "exemplary" is intended to mean serving as an illustration or example of something, and is not intended to indicate a preference.

With reference to FIG. 1, an exemplary system 100 that facilitates graphical display of a GPS Geo-Fencing Route Plan onto the GPS navigation interface 101 of an OEM hard-wired in-vehicle infotainment system, used to display vehicle positioning is illustrated. GPS navigation interface 101 receives signal 102 from the OEM hard-wired in-vehicle infotainment system 110.

The network 120 includes firmware 122 and software 124 for download onto one or more of the embodiments in the OEM hard-wired in-vehicle infotainment system 110. Function of network 120 will include a method to recognize and store the defined geo-fencing area from the GPS latitude and longitude coordinates in decimal degrees or degrees minute seconds.

The network 130, independent of the OEM hard-wired in-vehicle infotainment system 110, includes a Powertrain Control Module (PCM) 132, Body Control Module (BCM) 134 and Transmission Control Module (TCM) 136. Function of network 130 will recognize when vehicle engine is On or Off, speed of vehicle and transmission gear (Park, Drive, Neutral, First, Second, etc.). In one embodiment, the PCM 132 communicates directly to the OEM hard-wired in-vehicle infotainment system 110. In another embodiment, the BCM 134 communicates directly to the OEM hard-wired in-vehicle infotainment system 110 via signal 137. In yet another embodiment TCM 136 communicates directly to the OEM hard-wired in-vehicle infotainment system 110 via signal 137. In yet another embodiment the PCM 132 communicates to the BCM 134 and both or one of the modules communicates back to the OEM hard-wired in-vehicle infotainment system 110 via signal 137. In yet another embodiment the TCM 136 communicates to the BCM 134. In yet another embodiment, both the PCM 132, BCM 134 and TCM 136 communicate directly to each other. In yet another embodiment the PCM 132 and TCM 136 communicate directly to each other.

Signal 119 received from the OEM hard-wired in-vehicle infotainment system 110 is processed from the Gateway Module (GWM) 140, if equipped. If not equipped, the GWM 140 is bypassed.

Antenna 150 includes any embodiment of a singular or plurality of in-vehicle antenna(s) including GPS, Cellular, PCS, WI-FI or Satellite. Antenna 150 transmits and receives data for any and all embodiments included from the OEM hard-wired in-vehicle infotainment system 110 and networks 120, 130 and 140 via signal 141 if equipped with a GWM 140, if not equipped with a GWM 140 signal 119 transmits directly from the Antenna 150 to the OEM hard-wired in-vehicle infotainment system 110.

The network 160 includes an exemplary system that facilitates a method to transmit or receive data into the vehicles antenna(s) 150 via signal 151. The network 160 includes an array of transmitters including a Satellite 162, Wi-Fi 164 and Cell Tower 166. In one embodiment the data from network 160 will be transmitted or received from a Satellite transmitter 162 directly onto the vehicle Antenna 150 via signal 151. In another embodiment the data from network 160 will be transmitted or received from external Wi-Fi transmitter 164 directly onto the vehicle Antenna 150 via signal 151. In yet another embodiment the data from network 160 will be transmitted or received from Cell Tower 166 directly to a vehicle Antenna 150 via signal 151. In yet another embodiment the data from network 160 will be transmitted or received in conjunction with a plurality of transmitters or receivers including Satellite Antenna 162, external Wi-Fi Antenna 164 and Cell Tower 166 directly to the vehicle Antenna 150 via signal 151.

Cloud server 170 is an external remote device responsible for transmitting to and receiving data from network 160 via signal 161. Cloud server 170 collects data and in one embodiment compresses that data, included from networks 100, 110, 120, 130, 140, 150 and 160. Data to be available on the server includes, but not limited to, all information relating to capturing vehicle data.

Compressed data file 180 is a summary of information collected from data available on Networks 100, 110, 120, 130, 140, 150, 160 and 170 via signal 171. Compressed data file 180 can be configured to query out any and all data available obtained from networks 100, 110, 120, 130, 140, 150, 160 and 170. Geo-Fencing Route Planning GPS perimeters are uploaded onto the Server 170 and can be changed over-the-air with vehicle software or firmware re-flashing. When changes occur to GPS perimeters, i.e. perimeters deleted, added or modified, the subsequent changes to the Compressed File 180 will be made accordingly.

Referring now to FIG. 2, a summary of vehicle event data 200 as displayed onto the OEM hard-wired in-vehicle infotainment system 110 as outputted from Compressed File 180. Data exported from the server for this embodiment is Time of Day 201 as recognized on network 160, vehicle Gear 202 as recognized by network 130, vehicle Speed 203 as recognized by network 130, vehicle Engine (On/Off) 204 as recognized by network 130, Cardinal Directions 205 collected in including Latitude 206 in decimal degrees or degrees minute seconds and Longitude in decimal degrees or degrees minute seconds 207 as interpreted by the OEM hard-wired in-vehicle infotainment system 110 as received by the vehicle Antenna 150. Altitude 208, measured in feet or meters, as recognized by the OEM hard-wired in-vehicle infotainment system 110 as received by the vehicle Antenna 150. Time Duration in Gear 209 records the time duration a vehicle is in a set gear (Park, Drive, Neutral, First, Second, Third, etc.) as interpreted from network 130.

Figure 3:
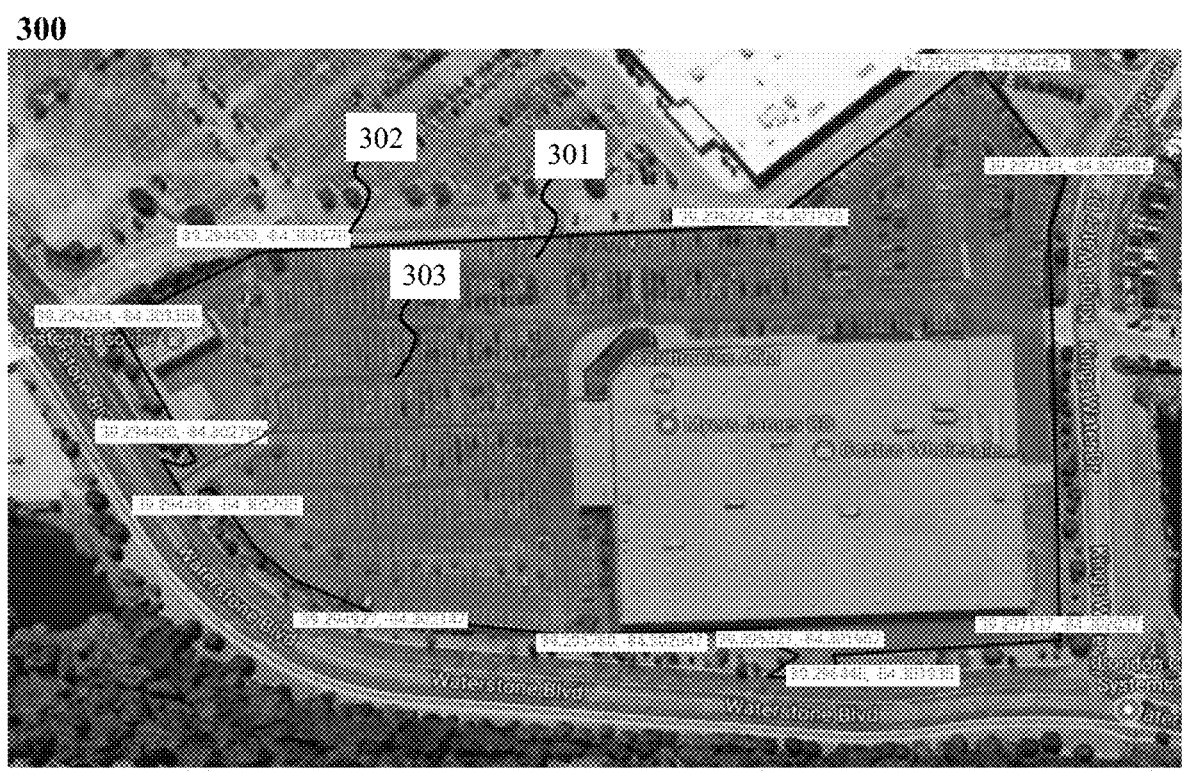
FIG. 3 is a mockup of an OEM hard-wired in-vehicle infotainment system GUI display of a GPS Geo-Fenced area and individual vehicle path.

Referring now to FIG. 3, a mockup of an OEM hard-wired in-vehicle infotainment system 110 GUI display of a GPS Geo-Fenced area with individual route path 300 is detailed. Area highlighted demonstrates a visual boundary of a geo-fenced area 301 where data is to be collected for the Geo-Fencing Route Planning System. Geo-fenced area 301 is defined by latitude decimal degrees or degrees minute seconds and longitude in decimal degrees or degrees minute seconds 302. Geo-fenced area is modified and updated by modifying network 120 by a firmware 122 or software 124 update, which is uploaded onto the Cloud Server 170, sent to network 160 including any embodiment of transmitters including Satellite 162, Wi-Fi 164 or Cell Tower 166 and interpreted by the OEM hard-wired in-vehicle infotainment system 110 or GWM 140. Vehicle route path 303 is graphically displayed onto a GUI that outlines the path of individual vehicle on route through the defined geo-fenced area 301.

Figure 4:
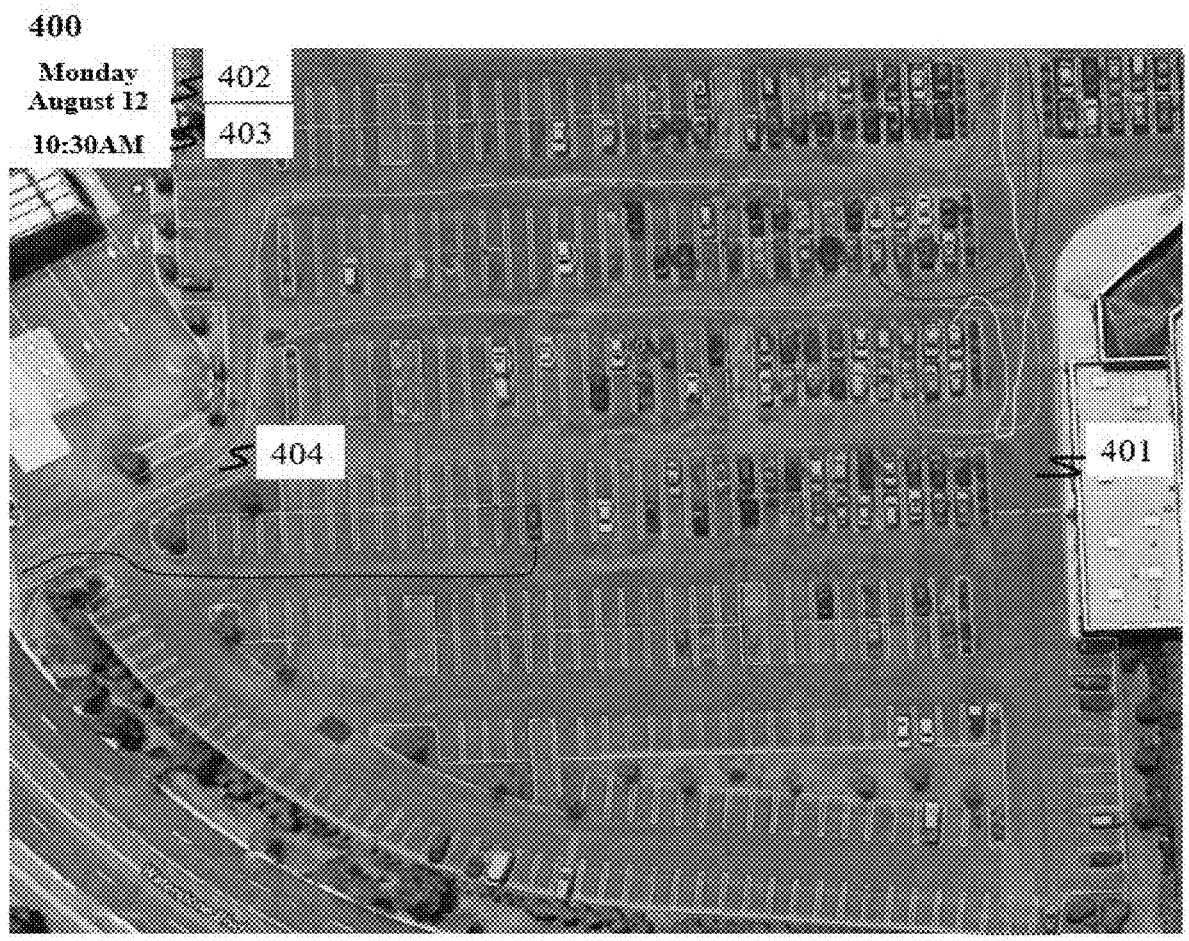
FIG. 4 is a mockup of an OEM hard-wired in-vehicle infotainment system GUI display of a GPS Geo-Fenced area with current crowdsourced vehicle route mapping.

Referring now to FIG. 4, a mockup of an OEM hard-wired in-vehicle infotainment system 110 GUI display of a GPS Geo-Fenced area with current crowdsourced vehicle route mapping 400 is detailed. Area highlighted demonstrates a visual boundary of a geo-fenced area 401 where data is to be collected for the Geo-Fencing Route Planning System. In the upper right-hand corner of the in-vehicle infotainment system GUI includes text indicating the current day and date 402. Below the day and date 402 is a text display of the current time 403. By means of crowdsourcing individual vehicle data, similarly equipped with the in-vehicle infotainment Geo-Fencing Route Planning System, actual individual vehicle route data can be collectively transmitted back to an individual in-vehicle infotainment system for visual display on a GUI 404.

Figure 5:
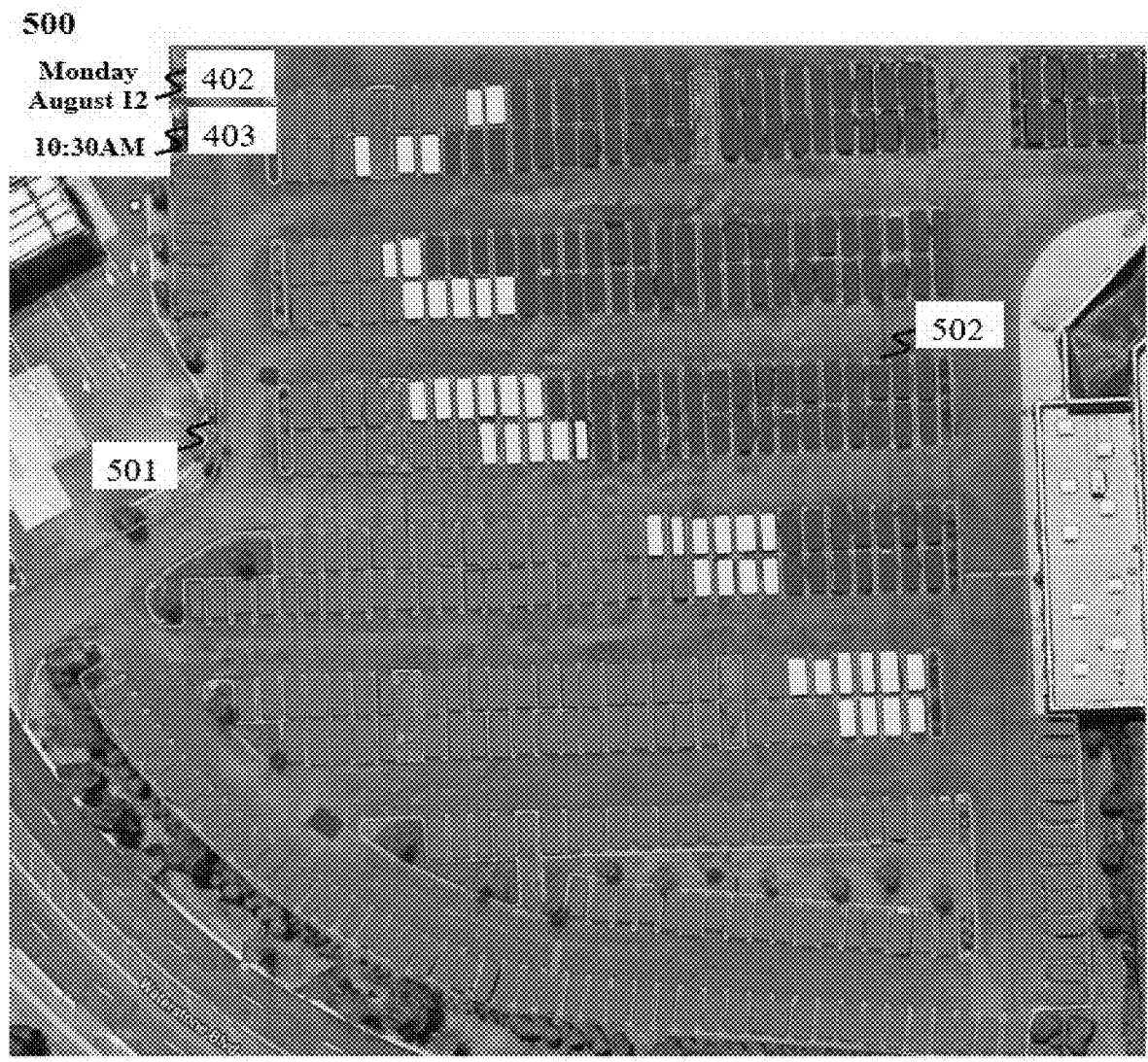
FIG. 5 is a mockup of an OEM hard-wired in-vehicle infotainment system GUI display of a GPS Geo-Fenced area and predictive parking avoidance aid for vehicle route planning.

Referring now to FIG. 5, a mockup of an OEM hard-wired in-vehicle infotainment system 110 GUI display of a GPS Geo-Fenced area with historical crowdsourced data, identifying the parked vehicle occupation spaces 500 for predictive parking avoidance aid and vehicle route planning is displayed. Area highlighted demonstrates a visual boundary of a geo-fenced area 501, where data is to be collected for the Geo-Fencing Route Planning System. In the upper right-hand corner of the in-vehicle infotainment system GUI includes text indicating the current day and date 402 as transmitted by network 160. Below the day and date 402 is a text display of the current time 403 as transmitted by network 160.

By means of crowdsourcing individual vehicle data, processed and transmitted in the cloud server 170, similarly equipped vehicles with the OEM hard-wired in-vehicle infotainment Geo-Fencing Route Planning System can utilize historical data, obtained from OEM modules collected at specific time and date intervals. Historical trends for vehicles identified from OEM modules to be in 'Park', is graphically displayed via color coded indicators representing the likely hood the vehicle space will be occupied at the given day and date 402 and current time 403 as transmitted by network 160. In one embodiment, color coded indicators are displayed by a Green, Yellow and Red overlay 502 onto the GUI of an individual vehicle's OEM hard-wired in-vehicle infotainment system 110.

Figure 6:
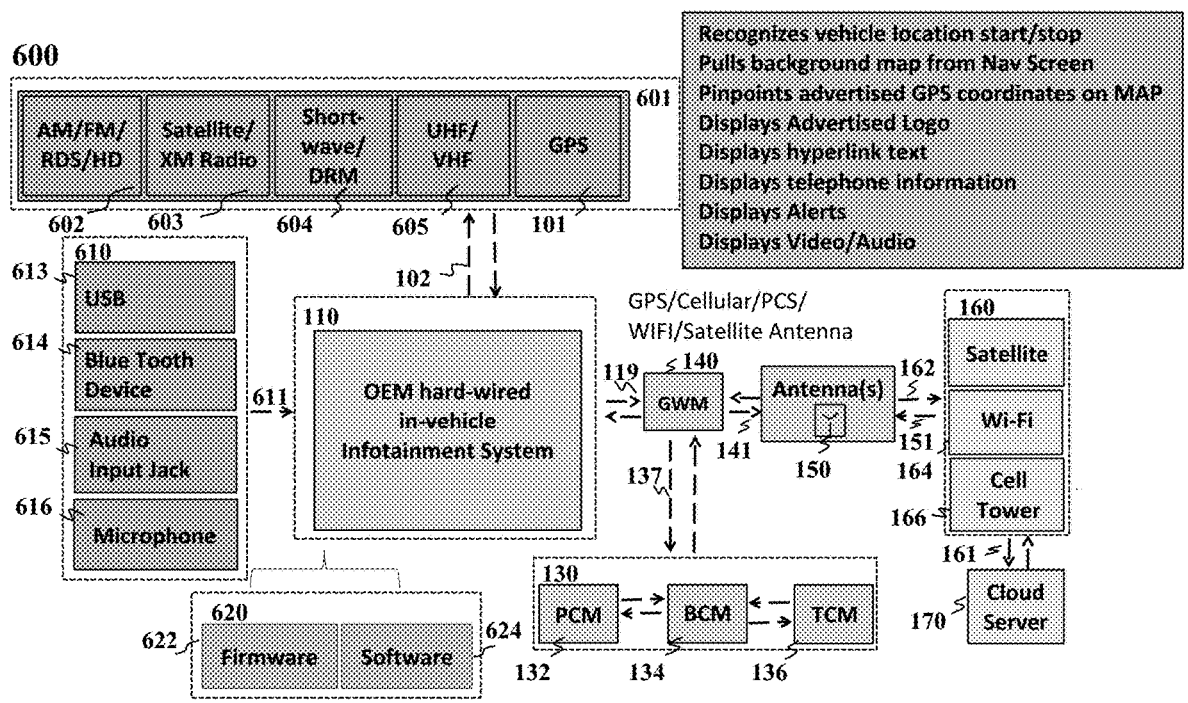
FIG. 6 is a flow diagram of an exemplary system that facilitates both GPS Proximity Based Advertising and Infotainment System Advertising.

Referring now to FIG. 6, an exemplary system 600 that facilitates the transmission of both GPS Proximity Based and non-GPS Proximity Based Infotainment System Advertisements onto the OEM hard-wired in-vehicle infotainment system 110 GUI of Network 601 via signal 102. Network 601, in exemplary example is the GUI for an Over-The-Air (OTA) broadcast signal AM, FM, HD or Radio Data System (RDS) 602 that is regularly broadcast over airways transmitted via a licensed station's transmitter. Other exemplary examples of a GUI display for Network 601 include Satellite or XM radio 603, a Short Wave or Digital Radio Mondiale (DRM) 604, UHF or VHF Radio and Television 605 and GPS navigation map 101. Network 610 inputs a signal 611 to the OEM hard-wired in-vehicle infotainment system 110 from a USB 613, a Bluetooth device 614, an audio input jack 615, or a microphone 616. The OEM hard-wired in-vehicle infotainment system 110 will transmit an advertisement onto the GUI of any of the embodiments included in network 601. In one embodiment the OEM hard-wired in-vehicle infotainment system 110 receives signal 119 from the GWM 140 and processes the in-vehicle infotainment system advertisement recognition protocol included in network 620 including firmware 622 or software 624. Signal 141 is received in-vehicle from Antenna 150 and supplied by signal 151 sent from a network of data transmitters 160, including, but not limited to a Satellite 162, Wi-Fi 164 or Cell Tower 166. Cloud Server 170, which defines the advertisement multimedia file to be transmitted, sends signal 161 onto network 160 for routing to the vehicle Antenna 150.

Figure 7:
FIG. 7 is a mockup of an OEM hard-wired in-vehicle infotainment system with GPS Proximity Based Advertising and Infotainment System Advertising.

Referring now to FIG. 7, a mockup of an OEM hard-wired in-vehicle infotainment system 110 for a GPS display 700 is illustrated. The GPS display 710 is comprised of a GPS icon 720 in the upper most left-hand portion of the display and a GPS navigation map. In one embodiment to display GPS Proximity Based Advertisements, a non-visible radius 730, with radius center positioned on the address location of advertised location is to be recognized based on vehicle position as detailed in the GPS location as received from the Antenna 150. In this embodiment advertisements including an icon or logo 740, a hyperlink phone number 760 that when paired to the user's phone, via Bluetooth connection 614, user will dial the advertised number with one-touch of the OEM hard-wired in-vehicle infotainment system 110 GUI. Also, in this embodiment is an advertised hyperlink to web-page 770, that if vehicle is connected to internet via network 160, the link will pull-up the advertised content when user selects the hyperlink 770 from the OEM hard-wired in-vehicle infotainment system 110. In yet another embodiment of this display, video advertisements 780 will be appear on the OEM hard-wired in-vehicle infotainment system 110 GUI. Video advertisements will be stored locally on the memory or streamed live to the OEM hard-wired in-vehicle infotainment system 110 as processed from the GWM 140, if equipped, and as received from the Antenna 150 from any of the embodiments capable of transmitting a multimedia video file included in network 160.

Figure 8:
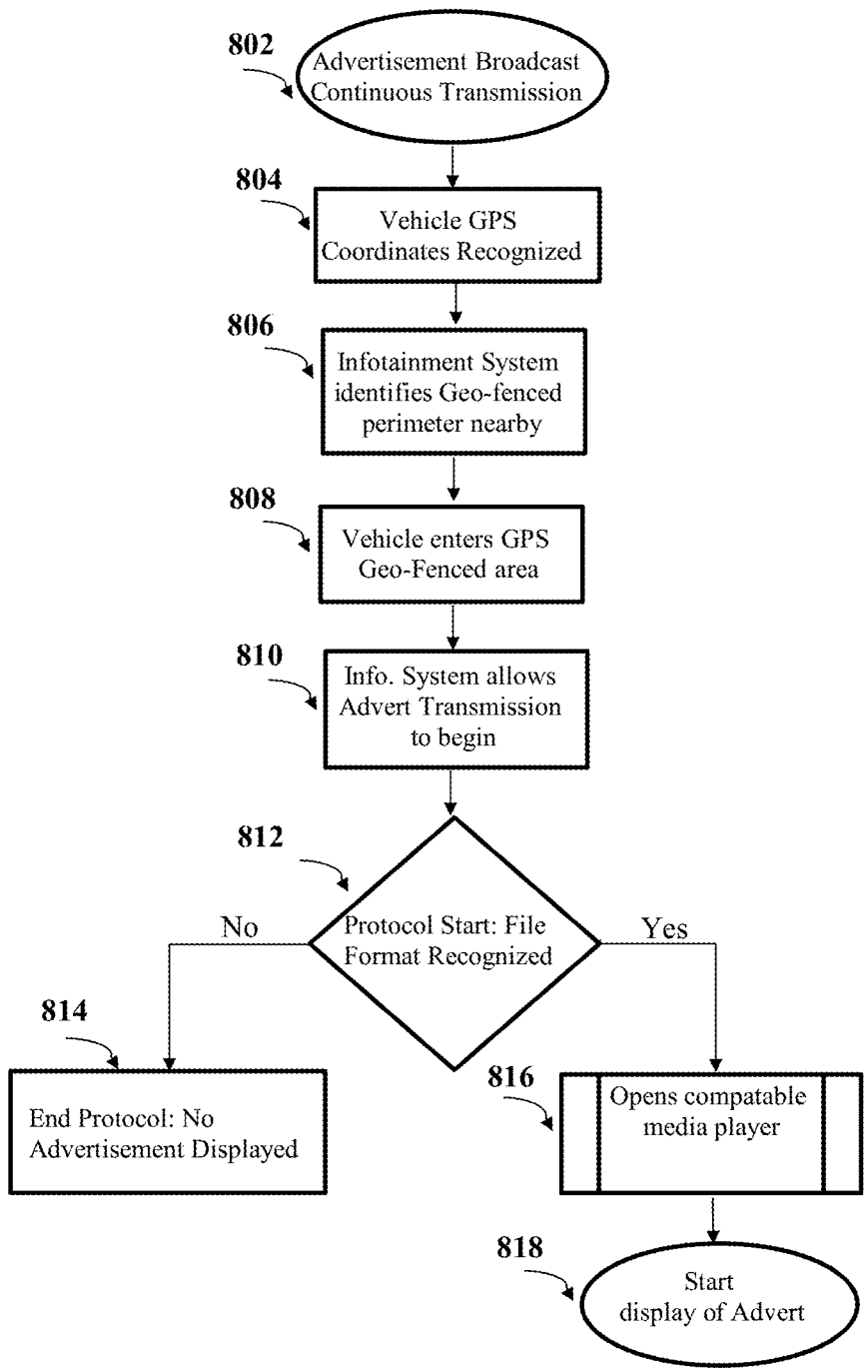
FIG. 8 is a functional block diagram of an exemplary system that facilitates In-vehicle Infotainment System Advertisement Recognition Protocol for display of a multimedia file for an advertisement onto an OEM hard-wired in-vehicle infotainment system.

Referring now to FIG. 8, a methodology that facilitates an OEM hard-wired In-Vehicle Infotainment Advertisement Recognition Protocol 800. The methodology 800 begins by an Advertisement Broadcast Continuous Transmission 802 emanating from the transition from any of the embodiments including Satellite 162, Wi-Fi 164 and Cell Tower 166. The methodology then transitions to the OEM hard-wired in-vehicle infotainment system 110 Recognition Protocol 800 whereby the Vehicle GPS Coordinates are Recognized 804. The methodology then transitions to the OEM hard-wired in-vehicle infotainment system 110 identifying the Geofenced perimeter nearby 806. Upon recognizing the geofenced perimeter nearby 806, the OEM hard-wired in-vehicle infotainment system 110 goes into a standby routine. Methodology transitions to identifying if the vehicle enters the GPS Geo-Fenced area 808. Once the GPS coordinates as reported by the OEM hard-wired in-vehicle infotainment system 110 have entered the Geo-Fenced area 808, the methodology transitions to allowing the Advert Transmission to begin 810. The methodology transitions to the Protocol Start: File Format Recognized 812, whereby a decision is made based on the processor recognizing the file format being transmitted. Methodology transitions to End Protocol: No Advertisement Displayed 814, if the file format is not recognized. If the file format is recognized, the methodology transitions to a subroutine whereby the OEM hard-wired in-vehicle infotainment system 110 opens up a compatible media player 816 based on the file extension transmitted. The methodology transitions to the OEM hard-wired in-vehicle infotainment system 110 start displaying advert 818.

Figure 9:
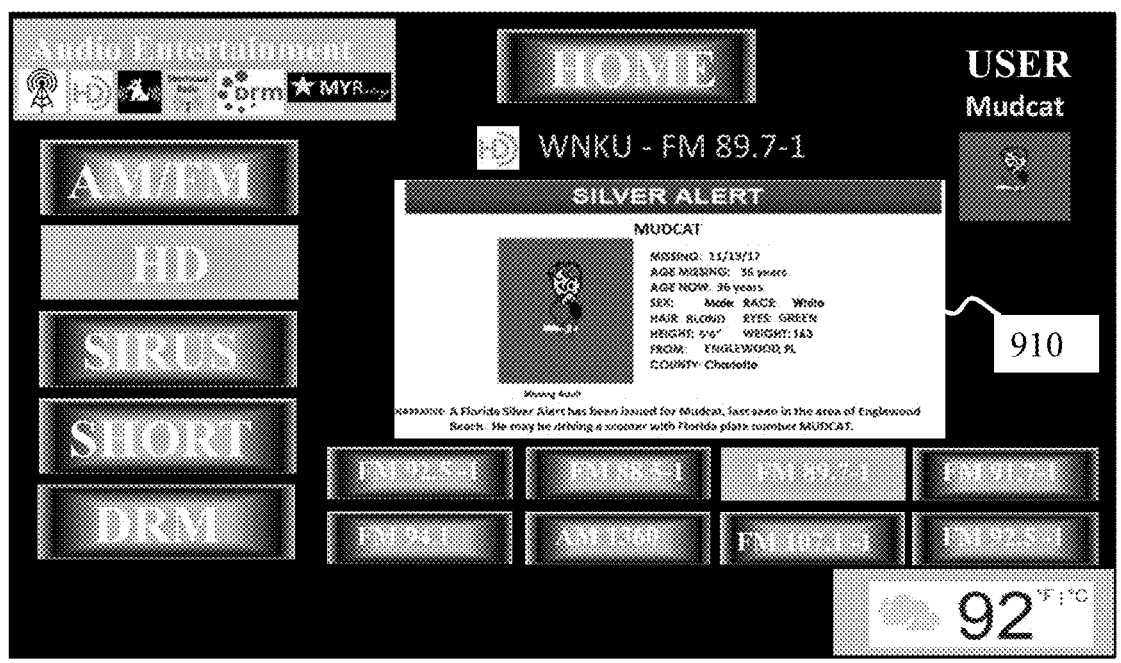
FIG. 9 is a mockup of an IPAWS visual alert displayed onto an OEM hard-wired in-vehicle infotainment system GUI.

Referring now to FIG. 9, a mockup of an OEM hard-wired in-vehicle infotainment system 110 GUI 900 is illustrated. In one embodiment an IPAWS visual alert in the form of an image with a released Silver Alert 910 is displayed. IPAWS visual alert is transmitted to the Antenna 150 by an alert disseminator which receives the IPAWS visual alert multimedia file from an alert aggregator, which receives the IPAWS visual alert multimedia file from an alerting authority. The IPAWS visual alert multimedia file, in one embodiment, includes descriptive details in the form of an image with picture and text embedded into the image file that includes details such as, but not limited to, missing date, age missing, age now, sex, race, hair, eyes, height, weight, city from, county, narrative details or any other pertinent information included in the Silver Alert 910.

Figure 10:
FIG. 10 is a mockup of an IPAWS visual alert video of a live traffic camera onto an OEM hard-wired in-vehicle infotainment system.

Referring now to FIG. 10, a mockup of an in-vehicle infotainment system 110 GUI 1000 is illustrated. In one embodiment an IPAWS visual alert in the form of a live traffic video feed 1010 is displayed. IPAWS visual alert live traffic video feed 1010 is sent from an alert authority and distributed via an alert aggregator to an alert disseminator. Alert disseminator then transmits the IPAWS visual alert live traffic video feed 1010 to network 160, whereby network 160 transmits to the Antenna 150 via signal 151. The Antenna 150 then transmits the live multimedia data file to the GWM 140 via signal 141. The GWM 140 then transmits signal 119 to an OEM hard-wired in-vehicle infotainment system 110. Evacuation routes and natural disaster areas can be broadcast to safely warn occupants of impending danger by transmitting live video feeds, via a multimedia data file, from public traffic cameras.

Figure 11:
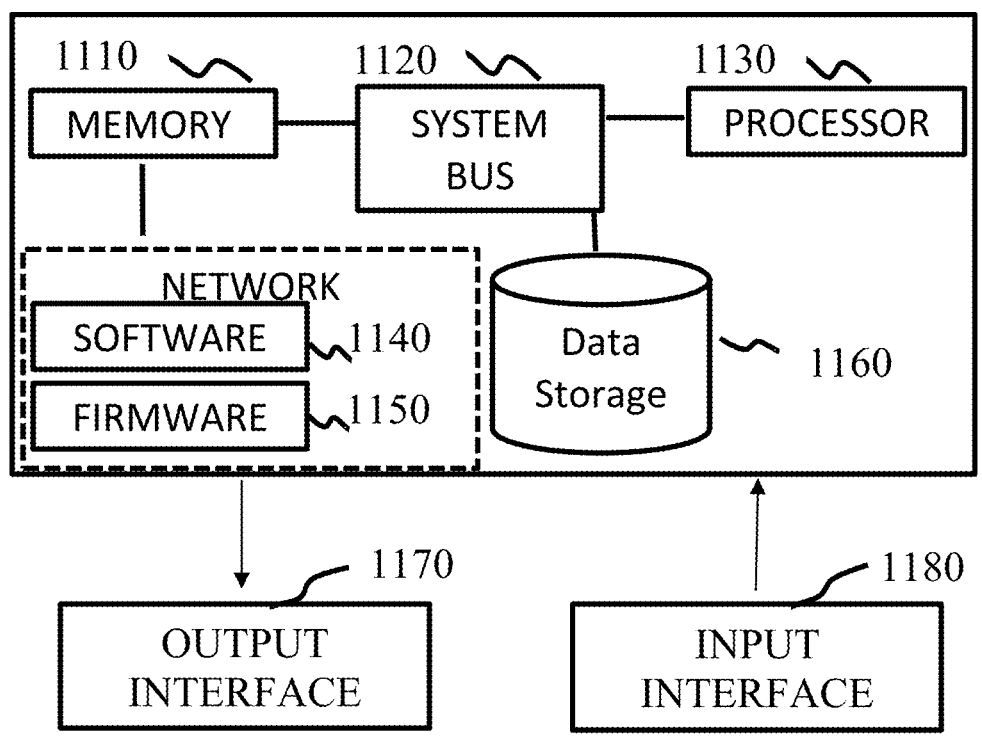
FIG. 11 is a functional block diagram that illustrates the methodology of an OEM hard-wired in-vehicle infotainment system in a computing embodiment.

Referring now to FIG. 11, an illustration of an exemplary computing device 1100 that can be used in accordance with the systems and methodologies disclosed herein is illustrated. The computing device 1100 includes memory 1110 which executes stored instructions for implanting functionality described as being carried out by one or more components discussed above. Data received from the system bus 1120 is processed by at least one processor 1130 that executes instructions that are stored in memory 1110. Instructions for implementing functionality described as being carried out by one or more components discussed above or instructions for one or more of the methods described above that are carried out by either the software 1140 or firmware 1150. Software 1140 or firmware 1150 may additionally include any combination of programmed applications as detailed herein. The computing device 1100 additionally includes a data storage 1160 that is accessible by the processor 1130 through the system bus 1120. The data storage 1160 may include executable instructions. The computing device 1100 also includes an input interface 1180 that allows external devices to communicate with the computing device 1100. For instance, the input interface 1180 may be used to receive instructions from an external computer device, from a user, etc. The computing device 1100 also includes an output interface 1170 that interfaces the computing device 1100 with one or more external devices. For example, the computing device 1100 may display video or images, etc. by way of the output interface 1170.

It is contemplated that the external devices that communicate with the computing device 1100 via the input interface 1180 and the output interface 1170 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent in-vehicle Infotainment System 110 network 601 to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Figure 12:
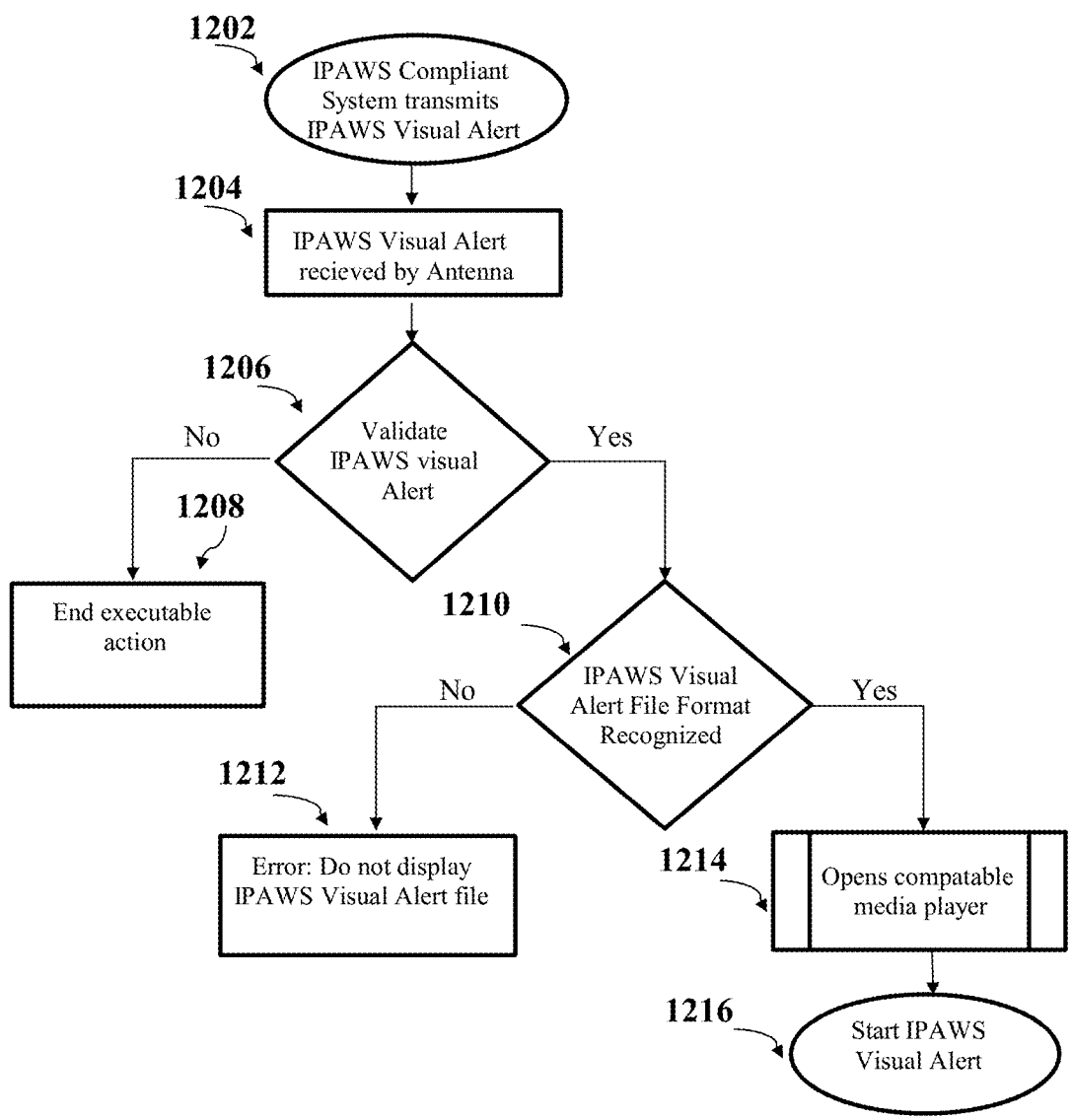
FIG. 12 is a flow diagram that illustrates an exemplary methodology for an IPAWS Visual Alert Recognition and Display Protocol.

Referring now to FIG. 12, a methodology 1200 that facilitates the transmission of a video or picture emanating from an IPAWS compliant CAP Origination Tool, directly onto the GUI of an OEM hard-wired in-vehicle infotainment system 110. The methodology begins at 1202, where an IPAWS compliant system transmits an IPAWS visual alert. The methodology then transitions to an IPAWS Visual Alert received by the Antenna 150. The methodology then transitions to an OEM hard-wired in-vehicle infotainment system 110 Validating the IPAWS Visual Alert 1206 data file. The methodology transitions to End executable action 1208, if the IPAWS visual alert can't be validated. If the OEM hard-wired in-vehicle Infotainment System 110 validates an IPAWS visual alert has been received, methodology will transition to IPAWS Visual Alert File Format Recognized 1210. If the IPAWS visual alert file format is not recognized, the methodology transitions to an Error: Do not display IPAWS Visual Alert file 1212. If the IPAWS Visual Alert file format is Recognized 1210, a subroutine whereby the OEM hard-wired in-vehicle infotainment system 110 opens up a compatible media player 1214, based on the multimedia file extension transmitted. The methodology then transitions to Start IPAWS Visual Alert 1216.

Figure 13:
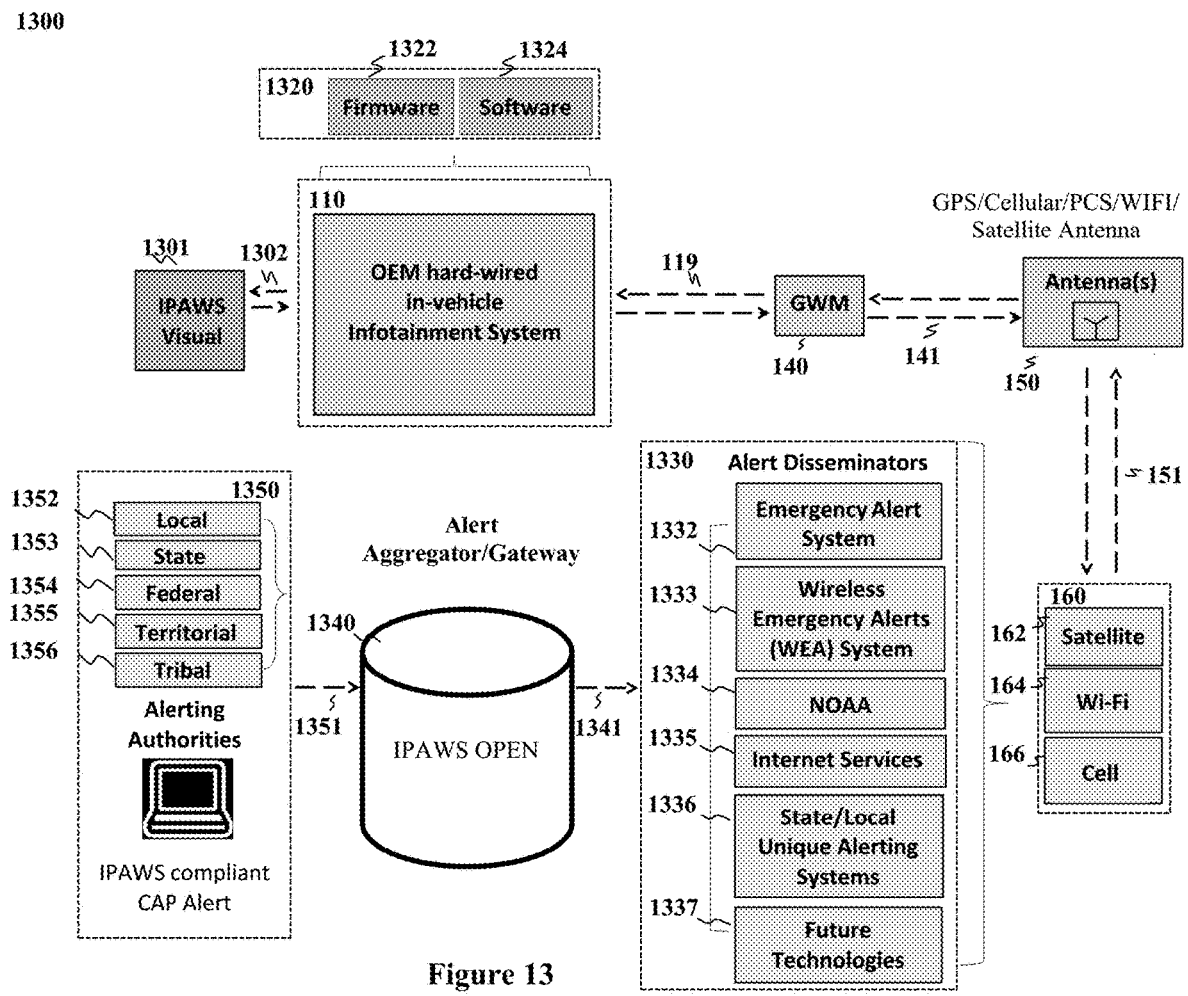
FIG. 13 is a functional block diagram that facilitates an exemplary system to display an IPAWS visual alert onto the GUI of a static OEM hard-wired in-vehicle infotainment system.

FIG. 13 is a functional block diagram of an exemplary system 1300 that facilitates the transmission of an IPAWS visual alert 1301 in the form of an image, picture, video or hologram as received in a multimedia data file transmitted via signal 1302, for display onto an OEM hard-wired in-vehicle infotainment system 110. Methodology starts with the creation of an IPAWS visual alert multimedia file created with a compliant Common Alert Protocol (CAP) Alert Origination Tool by Alerting Authorities network 1350, consisting of Local 1352, State 1353, Federal 1334, Territorial 1335 and Tribal 1336. Alerting Authorities 1350 transmits the IPAWS visual alert multimedia file via signal 1351, to an IPAWS Open platform for emergency network Alert Aggregator/Gateway 1340. Alert Aggregator/Gateway 1340 then transmits the IPAWS visual alert multimedia file via signal 1341 to Alert Disseminators IP distribution network 1330, consisting of an Emergency Alert System 1332, Wireless Emergency Alerts 1333, NOAA 1334, Internet Services 1335, State/Local Unique Alerting 1336 and Future Technologies 1337. Alert Disseminators IP distribution network 1330 then transmits the IPAWS visual alert multimedia file out via transmitters included within network 160 including Satellite 162, Wi-Fi 164 and Cell Tower 166.

Methodology continues to the vehicle following the IPAWS visual alert multimedia file being transmitted from signal 151 to the vehicle's Antenna(s) 150, which includes any embodiment of a singular or plurality of in-vehicle antenna(s) including GPS, Cellular, PCS, WI-FI or Satellite. Antenna 150 then transmits the IPAWS visual alert data multimedia file via signal 141 to the GWM 140. In-turn, the GWM 140 transmits the IPAWS visual alert data multimedia file via signal 119 to an OEM hard-wired in-vehicle infotainment system 110. The OEM hard-wired in-vehicle infotainment system 110 is equipped with network 1320, including Firmware 1322 or Software 1324 with the Infotainment System Picture or video Emergency Alert Display application. After the OEM hard-wired in-vehicle infotainment system 110 processes the IPAWS visual alert multimedia file, using any embodiment included with network 1320, signal 1302 outputs the IPAWS visual alert multimedia file to the OEM hard-wired in-vehicle infotainment system 110 GUI for display of the IPAWS visual alert 1301 in file formats, including, but not limited to an image, picture, hologram or video.

Figure 14:
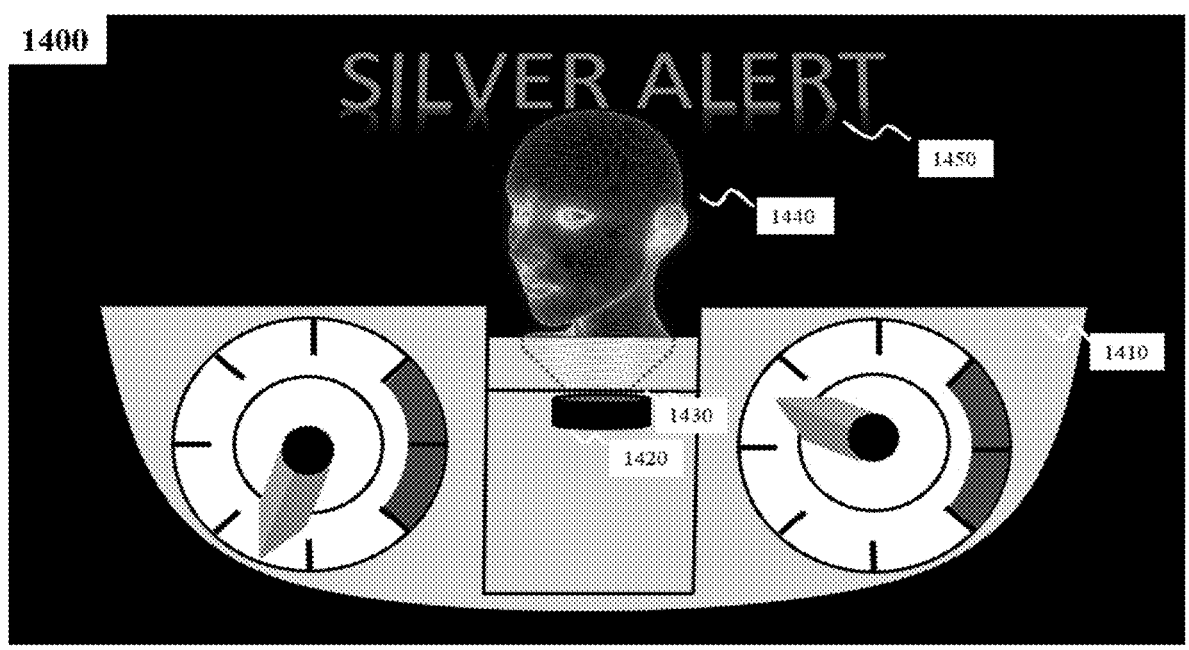
FIG. 14 is a mockup of an in-vehicle infotainment system with a holographic projection for a Visual Alert onto functional block diagram that facilitates an exemplary system to display an IPAWS visual alert.

Referring now to FIG. 14, a mockup of an OEM in-vehicle infotainment system holographic GUI 1400 is illustrated. In one embodiment an IPAWS visual alert in the form of a 3D hologram is displayed. Image of an OEM hard-wired in-vehicle infotainment system 110 holographic image, centered between the vehicle's gauge cluster 1410 is displayed. Included with the OEM hard-wired in-vehicle infotainment system 110 is a laser 1420 and spatial light modulator (SLM) 1430 used to display a holographic image. Spatial light modulator 1430 will display a 2D or 3D graphical image 1440 as received by signal 119 sent from an IPAWS visual alert. Along with the 2D or 3D image 1440, holographic text 1450 in conjunction or independent of the image can be displayed in hologram form.

While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Plurality of in-vehicle communication networks pre-existing in vehicle including CAN bus networks designed with multiplex electrical wiring, allowing in-vehicle microcontrollers and modules to communicate between each other exist in a multitude of embodiments. Local Interconnect Network (LIN) operating on 1 Kbps to 20 Kbps. High Speed CAN (HSCAN) operating between 125 Kpbs and 500 Kbps. Low Speed CAN (MSCAN) operating between 40 Kbps and 125 Kbps. InfotainmentCAN (InfoCAN) and Local Area Network (LAN) operating from a transfer speed of both 40 Kbps to 125 Kbps or 125 Kbps to 500 Kbps, when paired to other in-vehicle microcontrollers or transfer speeds ranging from 1 Kbps to 11 Gbps on a cellular network or 11 Mbps to 7,000 Mbps operating on Wi-Fi, with speeds falling under Wi-Fi standards 802.11b, 802.11a, 802.11g, 802.11n or 802.11ac.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

Embodiments of "Firmware" and "Software" have been displayed separately in methodology for the purposes of detailing the individual functionality of each application disclosed here-in, comprising the applications; "In-vehicle GPS Geo-Fencing Route Planning", "GPS Proximity Based Advertising", "Infotainment System Advertising" and "Infotainment System Picture or Video Emergency Alert Display". It is further understood that embodiments of the disclosed network 120, 620 and 1320 encompassing "Firmware" 122, 622 and 1322 and "Software" 124, 624 and 1324 may include functionality in-full or in-part of all disclosed applications.

Image or picture file formats can include raster graphics in a dot matrix data structure, raw image file, 2D vector graphics, 3D vector graphics, compound and stereo format. Raster graphics can include any file extensions, including, but not limited to ANI, ANIM, APNG, ART, BMP, BPG, BSAVE, CAL, CIN, CPC, CPT, DDS, DPX, ECW, EXR, FITS, FLIC, FLIF, FPX, GIF, HDRi, HEVC, ICER, ICNS, ICO/CUR, ICS, ILBM, JBIG, JBIG2, JNG, JPEG, JPEG 2000, JPEG-LS, JPEG XR, KRA, MNG, MIFF, NRRD, ORA, PAM, PBM/PGM/PPM/PNM, PCX, PGF, PlCtor, PNG, PSD/PSB, PSP, QTVR, RAS, RBE, JPEG-HDR, Log luv TIFF, SGI, TGA, TIFF, TIFF/EP, TIFF/IT, UFO/UFP, WBMP, WebP, XBM, XCF, XPM and WD. Raw image file formats can include, but not limited to CIFF or DNG file formats. 2D vector graphics can include file formats, but not limited to AI, CDR, CGM, DXF, EVA, EMF, Gerber, HVIF, IGES, PGML, SVG, VML, WMF, Xar. 2D Compound formats can include CDF, DjVu, EPS, PDF, PICT, PS, SWF and XAML. 3D Vector graphics include AMF, Asymptote, .blend, COLLADA, .dgn, .dwf, .dwg, .dxf, eDrawings, .flt, HSF, IGES, IPA, JT, .MA, .MB, .OBJ, OpenGEX, PRC, STEP, SKP, STL, U3D, VRML, XAML, XGL, XVL, xVRML, X3D, 0.3D, 3DF, 0.3DM, 0.3ds, 3DXML and X3D. 3D compounded formats include, but not limited to EPS, PDF, PostScript, PICT, SWF and XAML.

Video file formats include, but not limited to file extensions, .webm, .mkv, .flv, .flv, .vob, .ogv, .ogg, .drc, .gif, .gifv, .mng, .avi, .mov, .qt, .wmv, .yuv, .rm, .rmvb, .asf, .amv, .mp4, .m4p (with DRM), .m4v, .mpg, .mp2, .mpeg, .mpe, .mpv, .mpg, .mpeg, .m2v, .m4v, .svi, 0.3gp, 0.3g2, .mxf. roq, .nsv, .flv, .f4v, .f4p, .f4a, and .f4b.

What is claimed is:
1. An OEM hard-wired in-vehicle infotainment system of a vehicle, the system comprising:
    a processing unit;
    a memory unit;
    a plurality of communication interfaces; and
    instructions stored in the memory unit, that, when executed by the processing unit causes to
    receive Global Positioning System (GPS) latitude and longitude coordinates over a communication interface of the plurality of communication interfaces;
    recognize a geo-fencing area from the GPS latitude and longitude information coordinates;
    receive one or more proximity-based advertising contents associated with the geo-fencing area over a second communication interface of the plurality of communication interfaces, wherein the one or more proximity-based advertising contents comprise an icon, phone number, other text content, image, video content, a hyperlinked content and an interactive;

select a compatible media player based on file format of the one or more proximity-based advertising contents;

display the geo-fencing area on a display screen of the vehicle through a GPS navigation interface;

play the one or more proximity-based advertising contents in the compatible media player overlaying the GPS navigation interface;

receive vehicle event data from one or more in-vehicle modules over a third communication interface of the one or more communication interfaces;

display the vehicle event data on the display screen of the vehicle through a graphical user interface associated with the one or more in-vehicle modules;

receive an integrated public alert and warning system (IPAWS) visual alert at a fourth interface;

validate the IPAWS visual alert; and display the IPAWS visual alert on the display screen on affirmative validation.

2. The system of claim 1, wherein the vehicle event data from one or more in-vehicle modules, the one or more proximity-based advertising contents, and the IPAWS visual alert are received through an in-vehicle gateway that facilitated interaction between the plurality of communication interfaces.

3. The system of claim 1, further configured to send vehicle event data and GPS location of the vehicle to a cloud service, which uses the vehicle event data and the GPS location with similar data collected from other vehicles in proximity of the vehicle for route planning.

4. The system of claim 3, wherein the GPS location of the vehicle is sent only when the vehicle enters the geo-fencing area.

5. The system of claim 1, wherein the display screen is a touch screen that allows a user to select the interactive content to initiate a call, wherein the interactive content is a phone number associated with any of the one or more proximity-based advertising content.

6. The system of claim 1, wherein the one or more in-vehicle modules comprises a powertrain control module (PCM), body control module, and transmission control module.

7. The system of claim 1, wherein the vehicle event data comprises Time of Day, Gear, Vehicle Speed, Vehicle Engine, Cardinal Directions including Latitude and Longitude, Altitude and Time Duration in Gear.

8. The system of claim 1, wherein the vehicle event data comprising a time of day, Gear mode, vehicle speed, vehicle engine status, cardinal direction, Altitude, and time duration in a particular gear mode is presented in tabular format.

9. The system of claim 1, wherein the IPAWS visual alert is received using a compliant common alert protocol (CAP) in a file format comprised as an image, video, or hologram file format.

10. The system of claim 1, wherein the plurality of communication interfaces comprise GPS interface, cellular interface, PCS interface, WiFi interface, satellite communication interface, ITA broadcast receiving interface, Local Interconnect Network (LIN) interface, Local Area Network (LAN) interface, High Speed CAN (HSCAN) interface, Low Speed CAN (LSCAN) interface, CAN interface.

11. A method for collecting and displaying data on an in-vehicle infotainment system, the method comprising:

receiving, at the in-vehicle infotainment system, (GPS) latitude and longitude coordinates over a first communication interface of a plurality of communication interfaces of the in-vehicle infotainment system;

recognizing, at in-vehicle infotainment system, a geo-fencing area from the GPS latitude and longitude information coordinates;

receiving, at the in-vehicle infotainment system, one or more proximity-based advertising contents associated with the geo-fencing area over a second communication interface of the plurality of communication interfaces, wherein the one or more proximity-based advertising contents comprise an icon, phone number, other text content, image, video content, a hyperlinked content, and an interactive context;

selecting, at the in-vehicle infotainment system, a compatible media player based on file format of the one or more proximity-based advertising contents;

displaying, at the in-vehicle infotainment system, the geo-fencing area on a display screen of the vehicle through a GPS navigation interface;

playing, at the in-vehicle infotainment system, the one or more proximity-based advertising contents in the compatible media player overlaying the GPS navigation interface;

receiving, at the in-vehicle infotainment system, vehicle event data from one or more in-vehicle modules over a third communication interface of the one or more communication interfaces;

displaying, at the in-vehicle infotainment system, the vehicle event data on the display screen of the vehicle through a graphical user interface associated with the one or more in-vehicle modules;

receiving, at the in-vehicle infotainment system, an integrated public alert and warning system (IPAWS) visual alert at a fourth interface;

validating, at the in-vehicle infotainment system, the IPAWS visual alert; and displaying, at the in-vehicle infotainment system, the IPAWS visual alert on the display screen on affirmative validation.

12. The method of claim 11, wherein the vehicle event data from one or more in-vehicle modules, the one or more proximity-based advertising contents, and the IPAWS visual alert are received through an in-vehicle gateway that facilitated interaction between the plurality of communication interfaces.

13. The method of claim 11, further configured to send vehicle event data and GPS location of the vehicle to a cloud service, which uses the vehicle event data and the GPS location with similar data collected from other vehicles in proximity of the vehicle for route planning.

14. The method of claim 13, wherein the GPS location of the vehicle is sent only when the vehicle enters the geo-fencing area.

15. The system of claim 11, wherein the display screen is a touch screen that allows a user to select the interactive content to initiate a call, wherein the interactive content is a phone number associated with any of the one or more proximity-based advertising content.

16. The method of claim 11, wherein the one or more in-vehicle modules comprises a powertrain control module (PCM), body control module (134), and transmission control module.

17. The method of claim 11, wherein the vehicle event data comprises Time of Day, Gear, Vehicle Speed, Vehicle Engine, Cardinal Directions including Latitude and Longitude, Altitude and Time Duration in Gear.

18. The system of claim 11, wherein the vehicle event data comprising time of day, Gear mode, vehicle speed, vehicle engine status, cardinal direction, Altitude, and time duration in a particular gear mode is presented in tabular format.

19. The method of claim 11, wherein the IPAWS visual alert is received using a compliant common alert protocol (CAP) in a file format comprised as an image, video, or hologram file format.

20. The method of claim 11, wherein the plurality of communication interfaces comprise GPS interface, cellular interface, PCS interface, WiFi interface, satellite communication interface, ITA broadcast receiving interface, Local Interconnect Network (LIN) interface, Local Area Network (LAN) interface, High Speed CAN (HSCAN) interface, Low Speed CAN (LSCAN) interface, CAN interface.

* * * * *